United States Patent
Ahmed et al.

(10) Patent No.: US 10,749,255 B2
(45) Date of Patent: Aug. 18, 2020

(54) STEERABLE ANTENNA ARRAY

(71) Applicant: Intel Corporation, Santa Clara, CA (US)

(72) Inventors: Khaled Ahmed, Anaheim, CA (US); Shengbo Xu, Newark, CA (US)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 15/941,304

(22) Filed: Mar. 30, 2018

(65) Prior Publication Data

US 2019/0305416 A1 Oct. 3, 2019

(51) Int. Cl.

| | |
|---|---|
| *H01Q 3/26* | (2006.01) |
| *H01Q 21/06* | (2006.01) |
| *H01Q 3/36* | (2006.01) |
| *H01P 1/18* | (2006.01) |
| *H01Q 3/22* | (2006.01) |
| *H01Q 3/24* | (2006.01) |
| *H04B 7/06* | (2006.01) |
| *H01Q 15/14* | (2006.01) |

(52) U.S. Cl.
CPC ............ *H01Q 3/2658* (2013.01); *H01P 1/182* (2013.01); *H01Q 3/22* (2013.01); *H01Q 3/24* (2013.01); *H01Q 3/36* (2013.01); *H01Q 15/148* (2013.01); *H01Q 21/061* (2013.01); *H04B 7/0617* (2013.01)

(58) Field of Classification Search
CPC ... H04B 7/0617; H01P 1/182; H01Q 3/26583; H01Q 3/36; H01Q 3/44; H01Q 15/148; H01Q 21/061
See application file for complete search history.

(56) References Cited

U.S. PATENT DOCUMENTS

| | | | |
|---|---|---|---|
| 6,630,772 | B1 | 10/2003 | Bower et al. |
| 2004/0229346 | A1 | 11/2004 | Kohara et al. |
| 2005/0057432 | A1 | 3/2005 | Anderson |
| 2007/0081242 | A1 | 4/2007 | Kempa et al. |
| 2008/0239791 | A1 | 10/2008 | Tran |
| 2012/0206787 | A1 | 8/2012 | Apostolos et al. |
| 2012/0257204 | A1 | 10/2012 | Walters |

OTHER PUBLICATIONS

Search Report and Written Opinion dated Jun. 7, 2019 issued for PCT Application No. PCT/US2019/016986.

(Continued)

*Primary Examiner* — Dao L Phan
(74) *Attorney, Agent, or Firm* — Schiff Hardin LLP

(57) ABSTRACT

A high gain non-mechanical steerable beamforming antenna is provided together with a system implementing the antenna. The steerable beamforming antenna uses a reflectarray structure in conjunction with a phased array antenna element configuration. The antenna elements may include micro particle arrays (MPAs), having a number of micro particles disposed thereon. The micro particles may be implemented as graphene elements or as plasmonic elements having a sufficiently high electron mobility and an electron carrier density that is controlled as a function of an applied electronic tuning signal. The change in electron carrier density of the MPA elements, in turn, causes a phase change in incident waves provided by a source feed, facilitating steering of a main beam of an antenna pattern associated with the reflected incident waves.

18 Claims, 11 Drawing Sheets

(56) References Cited

OTHER PUBLICATIONS

John Huang and Jose A. Encinar, Reflectarray Antennas, John Wiley & Sons, Inc., Hoboken, New Jersey, 2007, ISBN: 978-0-470-08491-5.

A. Forouzmand, and H. Mosallaei, "Real-Time Controllable and Multifunctional Metasurfaces Utilizing Indium Tin Oxide Materials: A Phased Array Perspective," IEEE Transactions on Nanotechnology, vol. 16, No. 2, p. 296, 2017.

Saeedeh Barzegar-Parizi, Mohammad Reza Tavakol, and Amin Khavasi, "Deriving Surface Impedance for 2-D Arrays of Graphene Patches Using a Variational Method," IEEE Journal of Quantum Electronics, vol. 53, No. 1, p. 7000106, 2017.

N. A. Kabir, Y. Yoon, J. R. Knab, J.-Y. Chen, A. G. Markelz, J. L. Reno, Y. Sadofyev, S. Johnson, Y.-H. Zhang, and J. P. Bird, "Terahertz transmission characteristics of high-mobility GaAs and InAs two dimensional-electron-gas systems," Appl. Phys. Lett. 89, 132109 (2006).

Eduardo Carrasco and Julien Perruisseau-Carrier, "Reflectarray Antenna at Terahertz Using Graphene" IEEE Antennas and Wireless Propagation Letters, vol. 12, 2013, pp. 253-256.

Yashwanth R. Padooru et al., "Dual capacitive-inductive nature of periodic graphene patches: Transmission characteristics at low-terahertz frequencies". Physical Review B 87, 115401 (2013).

STEERABLE ANTENNA ARRAY

TECHNICAL FIELD

Aspects described herein generally relate to steerable beamforming antennas and, more particularly, to electronically controlled steerable beamforming antennas.

BACKGROUND

Steerable antennas dynamically steer their radiation patterns, whereas beamforming antennas adaptively adjust their shape. Traditionally, beam steering may be implemented via mechanical or non-mechanical means. However, mechanical beam steering systems may be slow, have a narrow steering width, be expensive to produce, and function in an unreliable manner. Moreover, traditional non-mechanical beam steering solutions may use microelectromechanical (MEMS) mirrors that produce a narrow field of emission.

Conventional beamforming systems may use phased arrays and reflectarrays to provide beam forming with phase shifters that are realized via electronically-controllable components such as MEMS switches, varactor diodes, p-i-n diodes, or liquid crystal elements. Although such non-mechanical beamforming systems may perform faster than their mechanical counterparts, such systems still suffer from drawbacks such as high manufacturing costs and limited communication bandwidth, and are much too slow for high bandwidth applications and/or when one (or both) of the transmitter and receiver are moving relative to one another.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
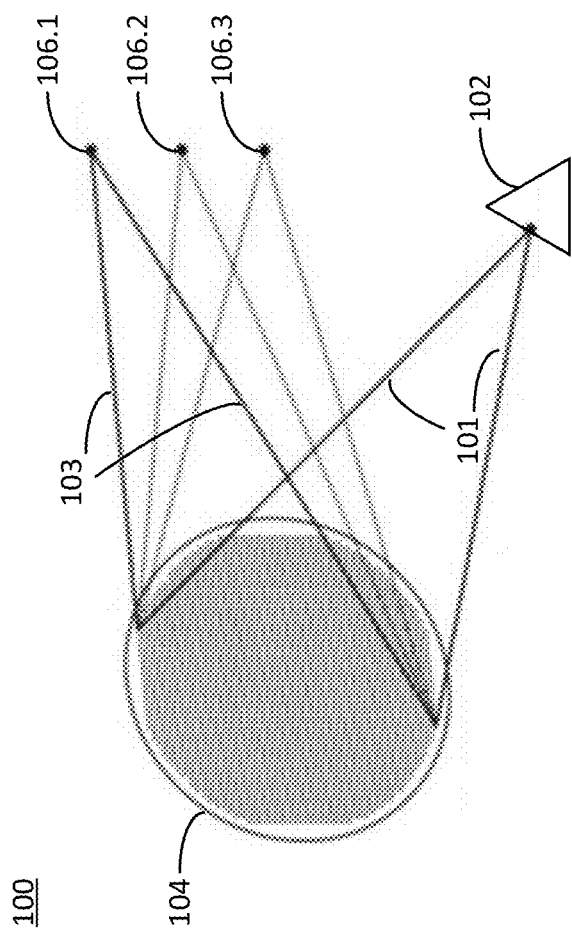
FIG. 1 illustrates an example electronically steerable beamforming antenna according to an exemplary aspect of the present disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Demand for ubiquitous access to information and entertainment at higher data rates is increasing, with consumers expecting wireless communications to reach the throughputs of wired communications. 5G communications are currently represented as a technology to meet these high data rate goals, which are roughly 1000 times faster than the current systems (e.g. 6 Gb/s). This demand for data bandwidth has led to interest in not only mmWave bands used in 5G applications (e.g., 24 Ghz-300 Ghz), but to the use of Terahertz frequency bands as well. Although these frequency bands may better support increased data bandwidth requirements, mmWave/THz frequencies have propagation limitations in terms of high path loss and relatively short communication distances. The Friis transmission equation, which is provided below as Equation 1, demonstrates such issues.

$$P_r = P_t + G_t + G_r + 20\log\left(\frac{c}{4\pi Rf}\right) \qquad \text{Eqn. 1}$$

With reference to Eqn. 1, the received power ($P_r$) is provided as a function of transmitted power ($P_t$), transmitter antenna gain ($G_t$), receive antenna gain ($G_r$), the distance (R) between a transmitter and a receiver, and a carrier frequency (f). Thus, the aforementioned propagation issues of associated with mmWave/THz frequencies may be overcome if the transmitter and receiver antennas have narrow directed beams such that the respective antenna gains $G_t$ and $G_r$ are larger than unity. In other words, by increasing the transmitter and/or receiver gains to a sufficiently high level, a reliable wireless link can be established at mmWave/THz frequencies and beyond.

Therefore, there is a need for appropriate steerable beamforming devices that focus transmitted and/or received signals in a desired direction (i.e., provide high gain values) to overcome the aforementioned unfavorable path loss for communications at mmWave/THz frequencies. Previous steerable antenna designs however, as discussed above, suffer from issues related to reliability, cost, and performance, particularly with regards to the limitations regarding how quickly such systems can perform adaptive beam steering. Given these issues, current steerable antenna designs are ill-suited to supporting mmWave and THz frequency communications.

To remedy such issues, the aspects described throughout the present disclosure are directed to electronically steerable beamforming antennas implementing micro-particle arrays (MPAs). These MPAs may be manufactured using lithography or epitaxy, for example, which are both low-cost manufacturing processes. Moreover, the electronically steerable beamforming antennas discussed herein advantageously allow for beam steering and/or beamforming to be performed very quickly (e.g., on the order of microseconds). In doing so, alignment between a transmitter and receiver can be maintained with a relatively high gain to overcome the path loss issues mentioned above. To do so, the aspects of the electronically steerable beamforming antennas discussed herein may include a reflectarray architecture that leverages MPAs in a phased array configuration. The particles in the MPA have properties that alter the phase of an incoming source wave to thereby adjust the direction of the main beam of a reflected incident wave beam pattern, as further discussed below.

FIG. 1 illustrates an example electronically steerable beamforming antenna according to an exemplary aspect of the present disclosure. As shown in FIG. 1, the reflectarray antenna 100 includes a source 102 and a reflectarray 104. In the example shown in FIG. 1, the reflectarray 104 is fed from the source 102 in an offset direction. However, aspects include the source 102 being located in any suitable position relative to the reflectarray 104. The source 102 can be configured as any suitable component configured to direct electromagnetic radiation as incident waves 101 towards the surface of the reflectarray 104. For example, source 102 can be a feed horn, antenna element(s), etc., configured to direct incident waves 101 that are generated as part of data communications. Thus, the source 102 can be coupled to various transmitters, receivers, transceivers, etc., which are not shown in FIG. 1 for purposes of brevity.

The reflectarray 104 can facilitate both beam steering and beamforming, and can include any suitable number of individual MPAs, as further discussed herein, to do so. For example, in an aspect, the reflectarray 104 can be implemented as the 2-D reflectarray 400, as shown and further discussed herein with reference to FIG. 4, which has 42 MPAs 300. The MPAs can be electronically tunable via an electronic tuning signal that is applied to each MPA via a controller in the form of, for example, an AC or DC electrical signal having an adjustable amplitude. The controller is not shown in FIG. 1 for purposes of brevity, and is further discussed herein with reference to FIG. 2.

In response to the applied electronic tuning signals, the electron carrier density associated with the particles on each MPA are altered, which in turn alters the phase imparted on the incident wave 101 provided by the source 102. As a result of changing the incident wave phase in this way, the incident wave 101 is reflected off of the surface of the reflectarray 104 as a reflected incident wave 103 having a complex beamforming pattern that may be adjusted. For instance, the beamforming pattern associated with the reflected incident wave 101 may be focused onto various points in three-dimensional space in response to three different applied electronic tuning signals, such as each of focus points 106.1-106.3, as shown in FIG. 1. To provide another example, the beamforming pattern associated with the reflected incident wave may be adjusted such that a main beam is steered in various directions in response to different combinations of electronic tuning signals.

The reflectarray antenna 100 is thus capable of rapid electronic beam steering and/or beamforming, making it well-suited for applications requiring high data throughput, such as mmWave and THz frequency communications. It should be noted, however, that aspects of the reflectarray antenna as described herein may be applicable to any suitable frequency or band of frequencies, and is not limited to mmWave and THz frequency bands.

To facilitate beam steering and/or beamforming, aspects include the MPAs and/or the individual particles on the MPAs of the reflectarray 104 being configured as antenna arrays. For example, with reference to FIG. 4 for clarity, aspects include each column or row of MPAs 300 on a reflectarray antenna being configured as a separate one-dimensional array. This configuration is further explained below reference to FIG. 2.

Figure 2:
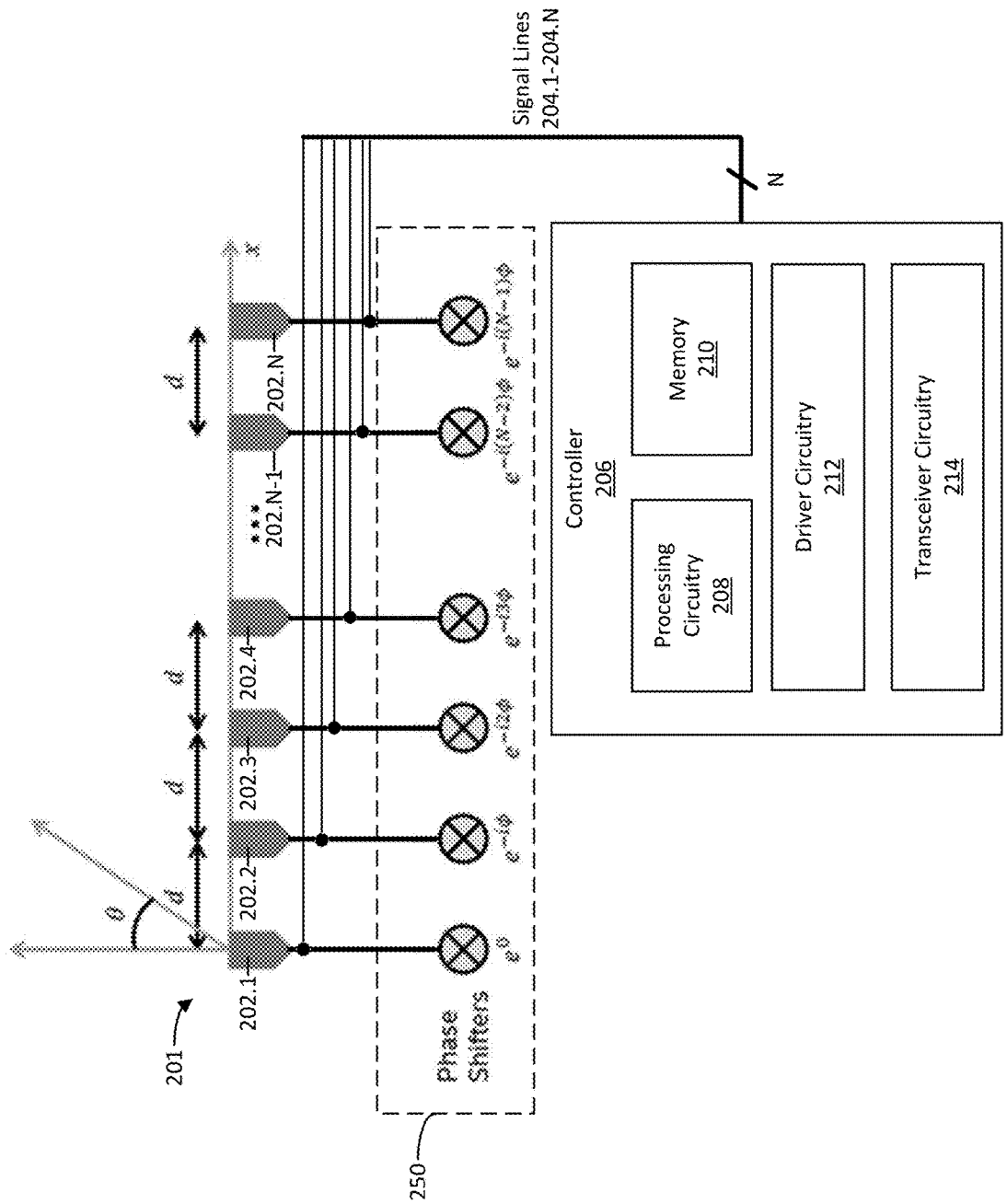
FIG. 2 illustrates a schematic of an antenna array and controller configured to facilitate control of a radiation pattern in a non-mechanical manner according to an exemplary aspect of the present disclosure.
Figure 4:
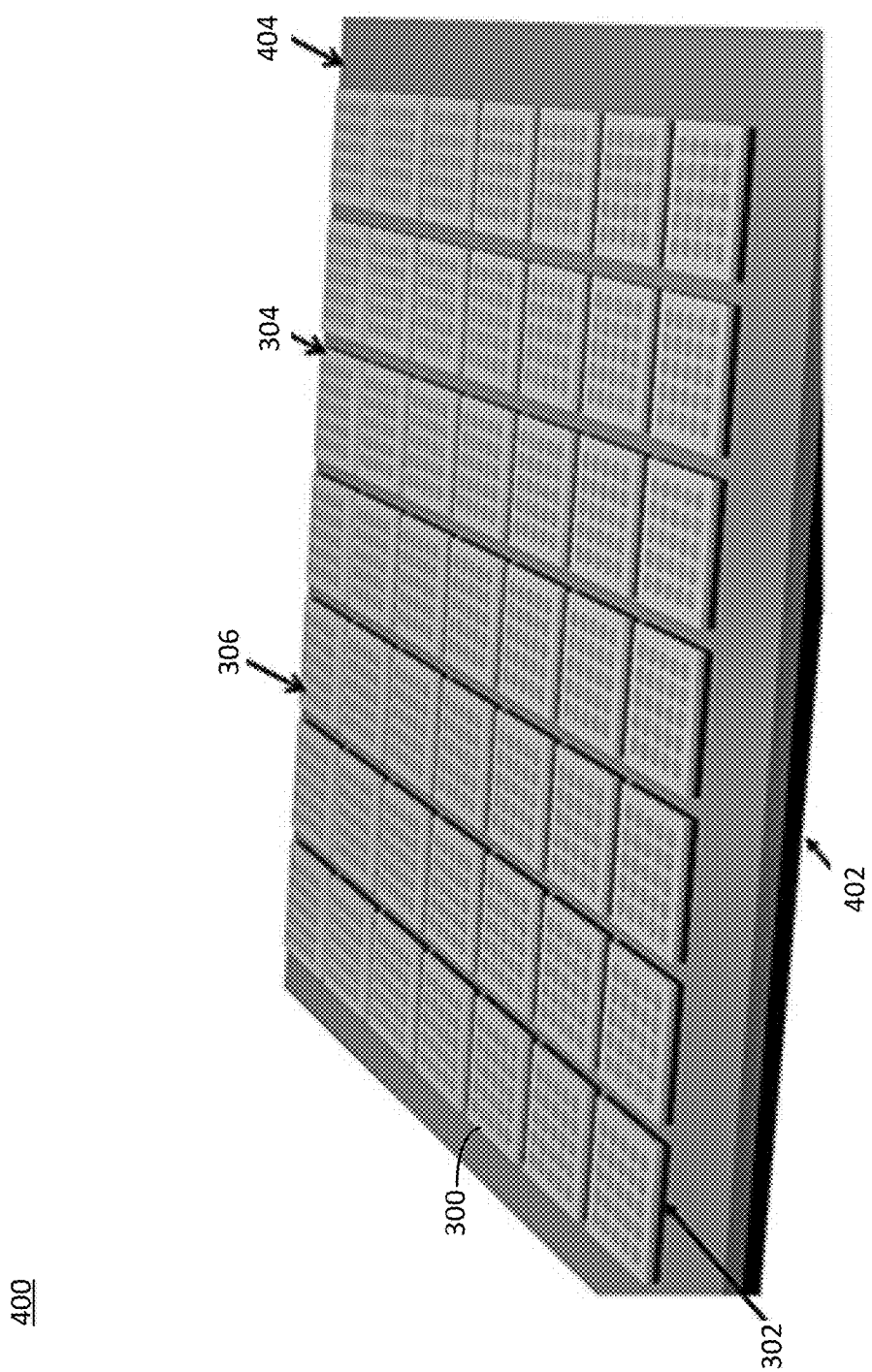
FIG. 4 illustrates a schematic of a 2-D reflectarray incorporating MPAs according to an exemplary aspect of the present disclosure.

FIG. 2 illustrates a schematic of an antenna array and controller configured to facilitate control of a radiation pattern in a non-mechanical manner according to an exemplary aspect of the present disclosure. For example, FIG. 2 shows a one-dimensional array 201 having any suitable number N of antenna elements 202.1-202.N positioned along the x-axis and spaced a distance "d" apart from one another (i.e., the "pitch" between antenna elements). In an aspect, each antenna element 202.1-202.N represents an individual MPA along a single dimension (i.e., a row or column) of the reflectarray, as further discussed herein. A single row or column of MPAs is shown in FIG. 2 as constituting an antenna array along a single axis for purposes of brevity, although aspects include each MPA that is associated with the reflectarray antenna as discussed herein (i.e., each row or column of MPAs) being similarly configured. Moreover, in accordance with such aspects, a separate conductive signal line 204.1-204.N can be coupled to each separate antenna element 202.1-202.N (e.g., signal line 204.1 can be coupled to antenna element 202.1, signal line 204.2 can be coupled to antenna element 202.2, etc.), and each conductive signal line 204.1-204.N can be further coupled to a controller 206. Thus, aspects include each MPA associated with the reflectarray (e.g., reflectarray 102 or reflectarray 400, as shown in FIGS. 1 and 4, respectively) being coupled to a separate signal line 204, which has an electronic tuning signal applied thereto via the controller 206.

In various aspects, the controller 206 can may be configured as any suitable type of computing device configured to facilitate control of the beam steering and beamforming functionality of the reflectarray. Again, only a one-dimensional array 201 is shown in FIG. 2 for purposes of brevity, thus array 201 is one of several one-dimensional arrays that form part of the reflectarray. Aspects include the controller 206 applying the electronic tuning signal to each MPA within each individual one-dimensional array.

To do so, the controller 206 can include processor circuitry 208 that is configured to carry out instructions to perform arithmetical, logical, and/or input/output (I/O) operations of the reflectarray antenna in which the array 201 is implemented and/or to control the operation of one or more components of the reflectarray antenna. For example, the processing circuitry 208 can include one or more microprocessors, memory registers, buffers, clocks, etc. Moreover, when transceiver circuitry 214 is present, processing circuitry 208 can further control functions associated with the transceiver circuitry 210 such as, for example, transmitting and/or receiving of wireless communications via the transceiver circuitry 210 and/or performing one or more baseband processing functions (e.g., media access control (MAC), encoding/decoding, modulation/demodulation, data symbol mapping, error correction, etc.).

The controller 206 can further include a memory 210 that stores data and/or instructions such that, when the instructions are executed by the processor circuitry 208, the controller 206 performs the various functions described herein. The memory 210 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 210 can be non-removable, removable, or a combination of both.

In various aspects, the controller 206 can include driver circuitry 212, which can facilitate the generation and application of the electronic tuning signals over signal lines 204.1-204.N. In an aspect, the processing circuitry 208 can execute instructions stored in the memory 210 to determine the various parameters (e.g., voltage amplitude, frequency, phase, etc.) of each electronic tuning signal based upon a particular beam direction and/or beam pattern that is desired. The processor circuitry 208 may communicate with the driver circuitry to cause the driver circuitry to generate an electronic tuning signal, which can then be applied to each respective signal line 204.1-204.N. For example, the driver circuitry 212 can be communicatively coupled to the processing circuitry 208, and include any suitable number of buffers, transistors, digital to analog converters, DC-to-DC converters, voltage sources, current sources, etc. In this way, the controller 206 can control the driver circuitry 212 to generate adjustable electronic tuning signals having the desired parameters, which are then applied to the individual MPAs via the coupled signal lines 204.1-204.N.

The controller 206 can further include transceiver circuitry 214, which may facilitate the reflectarray antenna supporting communications via any suitable number and type of communication protocols. To do so, the transceiver circuitry 214 may also include processor circuitry that is configured to transmit and/or receive wireless communications via one or more wireless technologies. For example, the transceiver circuitry 214 can include one or more transmitters and/or one or more receivers configured to transmit and receive wireless communications, respectively, via the reflectarray antenna. Those skilled in the relevant art(s) will recognize that the transceiver circuitry 214 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples.

In an aspect, the transceiver circuitry 214 is configured for wireless communications conforming to, for example, communications via the mmWave and/or Terahertz frequency bands. Further, those skilled in the relevant art(s) will understand that the transceiver circuitry 210 is not limited to specific communication protocols, and can be configured for communications that conform to any suitable number and type of communication protocols, such as one or more of the Institute of Electrical and Electronics Engineers' (IEEE) 802.11 protocols, including (but not limited to) Wi-Fi (e.g., 802.11g, 802.11n, 802.11ac), Wireless Gigabit (WiGig) as defined by IEEE 802.11ad, and/or one or more other 802.11 protocols as would be understood by one of ordinary skill in the art. The IEEE 802.11 protocols are incorporated herein by reference in their entirety.

For example, aspects include the controller 206 facilitating communications between two or more communication devices. For instance, the controller 206 can control the electronic tuning signals provided to the antenna elements 202.1-202.N to direct incident waves received from a source device to another communication device. The controller 206 can also facilitate communications in the opposite direction by directing incident waves received from the communication device back to the source. In any event, transceiver circuitry 214 can further facilitate the controller 206 receiving and processing data contained in such communications. In other aspects, the transceiver circuitry 214 can facilitate controller 206 receiving and/or transmitting data as part of separate data communications. For example, the transceiver circuitry 214 can facilitate the controller 206 receiving data included in an incident wave data transmission and/or encoding data onto a reflected incident wave to be transmitted to another communication device via the reflected incident wave using the steerable beamforming techniques as described herein.

In any event, data communications received via the transceiver circuitry 214 can contain, for example, information regarding a particular position in three-dimensional space to which incident waves should be directed. Aspects include the controller 206 utilizing such positional information to calculate the electronic tuning signal parameters to be applied to the antenna elements 202, which can be correlated to the desired beam direction and/or beam pattern. This may be accomplished, for example, in accordance with a lookup table (LUT) stored in memory 210. To provide another example, the electronic tuning signal parameters can be calculated by machine-readable instructions stored in the memory 210 (e.g., an electronic tuning signal calculation algorithm) and executed by the processing circuitry 208 as needed.

Again, aspects include the controller 206 generating electronic tuning signals that are applied to each MPA via each respective conductive signal line 204.1-204.N. This electronic tuning signal may be generated via the driver circuitry 212 and take the form of an AC and/or DC voltage with an amplitude that can be varied over time. As a result, the main beam of the reflected incident wave can be steered in a desired direction and/or to perform beamforming.

For further clarity regarding the nature of the electronic tuning signals and the advantages of the aspects described herein, the concept of antenna arrays are provided below. In accordance with antenna array theory, the amplitude and phase associated with each of the antenna elements 202.1-202.N may be altered to steer a main beam associated with a radiation pattern or to provide pattern beamforming. For example, Equation 2 below indicates that, based upon the pattern multiplication theorem, the total field radiation pattern of a one-dimensional antenna array along the x-direction can be obtained as:

$$AF_N = \frac{\sin\left(\frac{N}{2}\left(2\pi\frac{d}{\lambda}\sin\theta + \phi(t)\right)\right)}{N\sin\left(\frac{1}{2}\left(2\pi\frac{d}{\lambda}\sin\theta + \phi(t)\right)\right)} \quad \text{Eqn. 2}$$

With reference to Eqn. 2, it is noted that N is the number of array elements, $0 \leq \phi(t) \leq 2\pi$, $0 \leq \theta \leq 2\pi$, d is the inter-element spacing (pitch), $\phi(t)$ is the phase shift between two adjacent antenna elements, which can be controlled by the electronic tuning signal as a function of time t, and $\lambda$ is the operating wavelength. The array factor $AF_N$ is a multi-lobed pattern with a main beam at $\theta_p$, which is given by Equation 3 as follows:

$$\theta_p(t) = \sin^{-1}\left(-\frac{\lambda}{d} \cdot \frac{\phi(t)}{2\pi}\right) \quad \text{Eqn. 3}$$

Thus, the main beam direction of the array antenna (i.e., a single row or column of MPAs) can be arbitrarily pointed to any direction by the element phase shift $\phi(t)$. And this phase shift $\phi(t)$ can be modulated by applying an electrical bias between each adjacent antenna element via the electronic tuning signal. For example, if $\theta_p$ is swept from 0 to $\pi/2$, the phase shift $\phi(t)$ needs to be modulated by $2\pi\cdot(d/\lambda)$. Continuing this example, if $d/\lambda=0.25$, then $\phi(t)$ needs to be modulated by $\pi/2$.

Therefore, the use of an electronic tuning signal provides an advantage in that phase shifters 250, which are typically present in electronically-controlled antenna arrays as shown in FIG. 2, can be eliminated. These phase shifters 250 are traditionally associated with microelectromechanical (MEMS) switches, varactor diodes, p-i-n diodes, or liquid crystal elements, and add to the manufacturing cost of electronically steerable antenna systems. The phase shifters 250 also provide performance disadvantages in that their response time is much slower than that needed for high throughput data communications, thus limiting the wireless communication bandwidth of the system in which they are implemented. Moreover, because phase shifters 250 are typically discretized with a small number of predetermined phase values, the use of phase shifters 250 limits the flexibility and granularity of main beam steering and beam-forming pattern control. By supplanting the phase shifters 250 with the application of electronic tuning signals to particular MPA materials, the reflectarray aspects discussed herein overcome these disadvantages.

Figure 3A:
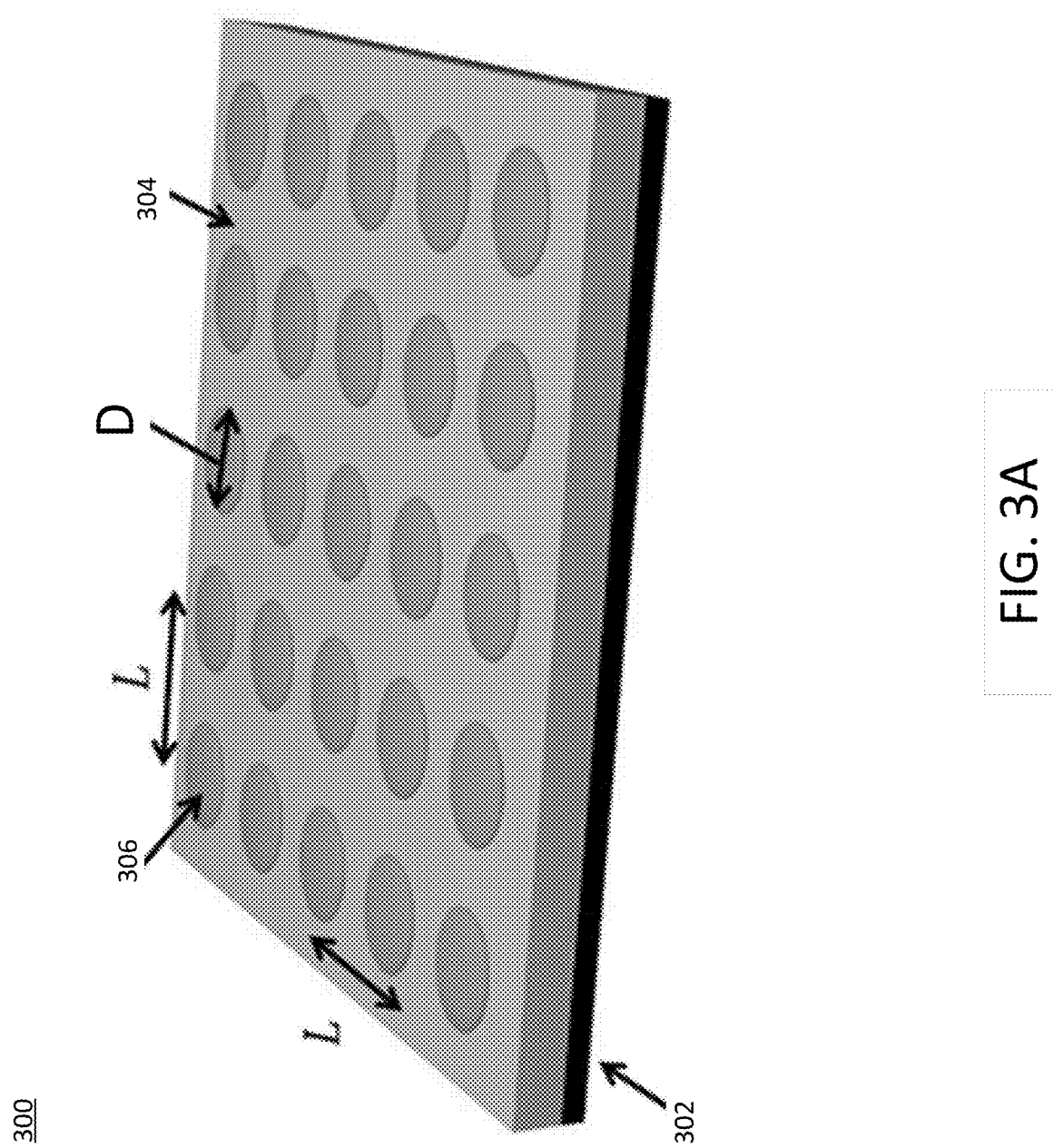
FIGS. 3A and 3B illustrate micro particle arrays (MPAs) according to an exemplary aspect of the present disclosure.
Figure 3B:
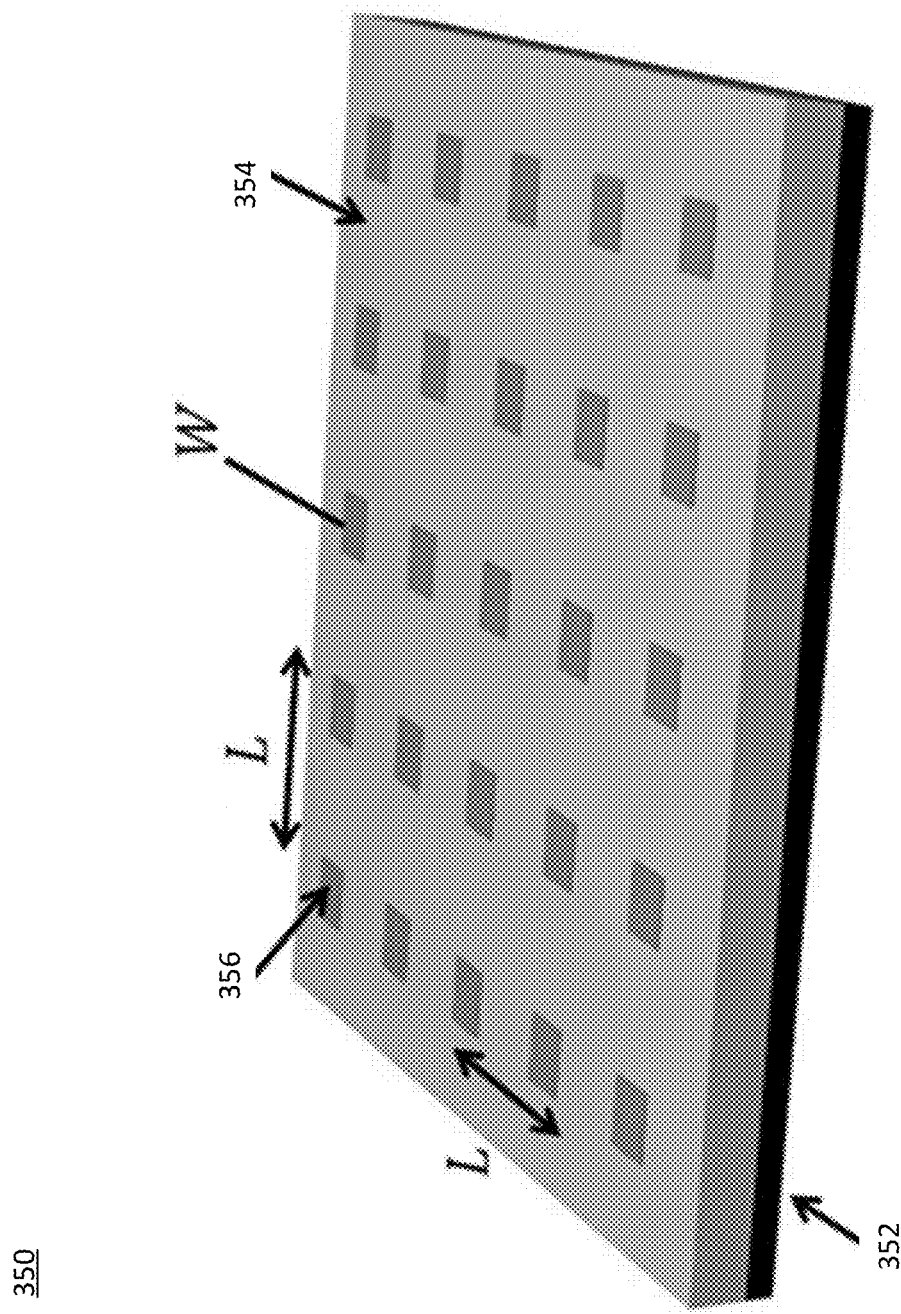

FIGS. 3A and 3B illustrate micro particle arrays (MPAs) according to an exemplary aspect of the present disclosure. In an aspect, each of the antenna elements 202.1-202.N, as shown and discussed above with reference to FIG. 2, may be implemented as an MPA, such as the MPAs 300 and 350 as shown and described with reference to FIGS. 3A and 3B, respectively The MPA 300 shown in FIG. 3A includes a metal gate 302 to which a conductive signal line may be coupled (e.g., one of conductive signal lines 204.1-204.N, as discussed with reference to FIG. 2) such that an electronic tuning signal may be applied to the metal gate 302. Furthermore, the MPA 300 may include a dielectric insulator substrate 304 disposed over the metal gate 302, and any suitable number of particles 306 disposed onto the dielectric substrate 304.

In various aspects, the particles 306 may be implemented as patches of any suitable type of material having an electron mobility value such that incident waves are substantially reflected and not absorbed. For example, the particles 306 may be implemented with materials having electron mobility in excess of 5000 cm$^2$/V-s, in excess of 10,000 cm$^2$/V-s, in excess of 20,000 cm$^2$/V-s, etc.

In one aspect, such as the examples shown in FIGS. 3A-3B, the particles 306 and 356, respectively, may be implemented with graphene patches having any suitable dimensions and/or shape based upon the operating frequency of the reflectarray antenna and/or other desired operating characteristics. But in other aspects, the particles 306 and 356 may be implemented as plasmonic devices, which may likewise have any suitable dimensions and/or shape based upon the operating frequency of the reflectarray antenna and/or desired operating characteristics. The implementation of plasmonic devices is further shown and discussed with reference to FIGS. 7A-7C.

For instance, as shown in FIG. 3A, the MPA 300 may have circular particles 306 with a diameter D and be spaced apart by a pitch L. In the example shown in FIG. 3A, the particles 306 are the same size, shape, and equally spaced in both dimensions on the dielectric insulator substrate 304. However, the particles 306 need not be disposed in such a manner, and may have varying sizes, shapes, and a different pitch in either dimension based upon design considerations. Furthermore, each MPA 300 that is part of the reflectarray antenna need not be identical, and MPAs with different particle sizes, shapes, pitch, and/or types may be intermingled within the same reflectarray antenna design. Additionally, other design parameters associated with the MPA 300, such as the thickness of the metal gate 302, the thickness of the dielectric insulator substrate 304, the overall size of the MPA 300, the number of particles 306, etc., may be selected as any suitable values to achieve the desired performance.

In an aspect, the size (e.g., diameter D) of the particles 306 and the pitch L are a subwavelength of the operating wavelength $\lambda$ of the reflectarray system. For example, the particles 306 may have a diameter D that is one-twentieth, one-tenth, one-quarter, one-half, etc., of the operating wavelength $\lambda$ (i.e., the wavelength $\lambda$ associated with the incident wave). In accordance with such aspects, the pitch L may likewise be a subwavelength of the operating wavelength such as, for example, one-twentieth, one-tenth, one-quarter, one-half, etc. To provide an illustrative example, if the operating frequency of the reflectarray antenna is between 1-5 THz ($\lambda$ ranges from 300 μm-60 μm), the particles 306 can have a diameter D of 15 μm and a pitch L of 30 μm.

Again, the particles 306 may be any suitable size or shape. Therefore, the MPA 350 as shown in FIG. 3B is similar to the MPA 300 shown in FIG. 3A with exception of the particles 306, which are circular patches, being replaced with particles 352, which are square patches. The MPA 350 also has a ground plane 352 and a dielectric insulator substrate 354, which are substantially similar or identical to ground plane 302 and a dielectric insulator substrate 304, as shown in FIG. 3A. Similar to MPA 300, the particles 356 may also have any suitable size W and pitch L between them, and may be sized and/or have a pitch in terms of a subwavelength of the operating wavelength such as, for example, is one-twentieth, one-tenth, one-quarter, one-half, etc. To provide another illustrative example, if the operating frequency of the reflectarray antenna is between 1-5 THz, the particles 356 can be squares with a length W of 15 μm and a pitch L of 30 μm.

Again, the reflectarray antenna may include any suitable number of MPAs, such as the MPAs 300 and 350, for example, as shown in FIGS. 3A and 3B, respectively. An example of a reflectarray incorporating a number of MPAs in this manner is further discussed below with reference to FIG. 4.

FIG. 4 illustrates a schematic of a 2-D reflectarray incorporating MPAs according to an exemplary aspect of the present disclosure. In an aspect, the reflectarray 400 can include any suitable number of MPAs, or "pixels," such as the 42 MPAs as shown in FIG. 4, for example. With reference to the example reflectarray antenna 400 as shown in FIG. 4, each MPA 300 can be an implementation of MPA 300 as shown in FIG. 3A, with each MPA 300 having a metal gate 302, a dielectric insulator substrate 304, and particles 306, as discussed herein with reference to FIG. 3A. However, aspects include the reflectarray 400 being implemented with various types of MPAs, with each MPA further being implemented with any suitable number and type of particles, such as graphene or plasmonic particles.

In an aspect, the reflectarray 400 further includes an antenna backplane, which may include a ground plane 402 and an interlayer dielectric 404. As discussed with regards to the MPAs, the ground plane 402 and the interlayer dielectric 404 may likewise be chosen having any suitable dimensions and be made of any suitable materials with regards to conductivity, thickness, permittivity, etc., to achieve desirable operating characteristics of the reflectarray 400. Furthermore, although not shown in FIG. 4 for purposes of brevity, each metal gate 302 that is associated with each respective MPA 300 may further be coupled to a signal line, such as the signal lines 204.1-204.N as discussed herein with reference to FIG. 2, for example. In various aspects, this coupling may be accomplished in any suitable manner, such as by forming a via using drilling, etching, lasers, etc., through the ground plane 402 and the interlayer dielectric 404 to bond the signal line to each metal gate 302 associated with each individual MPA 300. These signal lines may then be further coupled to a controller (e.g., controller 206, as shown in FIG. 2), which is also not shown in FIG. 4 for purposes of brevity but may be mounted at any suitable location on or external to the reflectarray 400. For example, the controller may be mounted on a surface of the ground plane 402 opposite the MPAs 300.

Again, once a signal line is coupled to each metal gate 302 associated with each individual MPA 300 and to the controller in this manner, the controller may provide a different electronic tuning signal for each MPA 300. This electronic tuning signal may provide an electrical bias that forms an electric field at each metal gate 302, which is insulated from both the ground plane 402 and the particles 306 via layers of dielectric insulator materials. The electric field induced at each metal gate 302 associated with each respective MPA 300 may thus be separately controlled and adjusted. The changes to the electric field at each MPA 300 results in a change in the electron carrier density of the particles 306 in each respective MPA 300, which then sets the phase of the reflected incident wave accordingly. In this way, aspects include the reflectarray 400 facilitating beam steering and beamforming in a non-mechanical fashion. This advantageously allows the reflectarray 400 to be manufactured in a low cost manner and for beam steering and beamforming to be performed in a fast and reliable manner.

For example, aspects include the reflectarray 400 executing beam steering and beamforming operations such that the beam angle and/or gain of a beam pattern may be adjusted on the order of several microseconds (e.g., 1 microsecond, 2 microseconds, 5 microseconds, 10 microseconds, etc.). In other words, aspects include the reflectarray 400 providing an adjusted beam angle that can be calculated from Eqn. 2 as a function of electron carrier density, which can be controlled by the applied gate bias on the metal gate 302 associated with each respective MPA 300.

Technical Details of Reflectarray Operation

To provide additional clarity regarding the operation of the reflectarray 400, the electrical characteristics of the reflectarray antenna are now provided. In particular, the electrical characteristics of MPAs are further explored with respect to FIG. 5, which illustrates an equivalent system of a MPA according to an exemplary aspect of the present disclosure.

It is first noted that the reflection coefficient of an MPA (e.g., MPA 300) is provided by Equation 4 as follows:

$$R = \frac{Z_{in} - Z_0}{Z_{in} + Z_0} \qquad \text{Eqn. 4}$$

Figure 5:
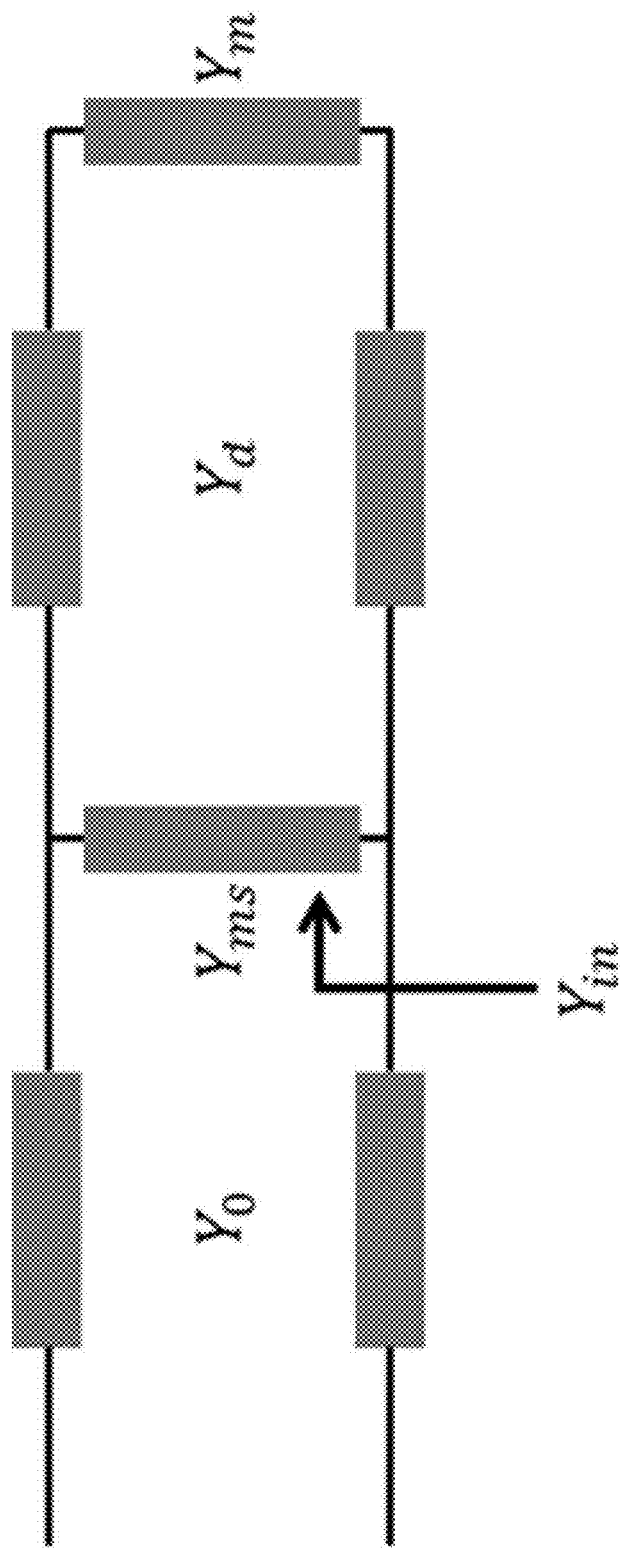
FIG. 5 illustrates an equivalent system of a MPA according to an exemplary aspect of the present disclosure.

With further reference to FIG. 5, it is noted that $Y_0$ is the free space admittance (1/377), $Y_{ms}$ is the admittance of the MPA array, $Y_d$ is the admittance of the dielectric substrate, and $Y_m$ is the admittance of the ground metal (a perfect metal means $Y_m = \infty$). Thus, for perfect metal grounding, the following approximate relationship for the input admittance is shown below in Equation 5:

$$Y_s = -iY_0\sqrt{\epsilon_{ox}}\cot\left(\frac{2\pi\sqrt{\epsilon_r}}{\lambda}t_d\right) \qquad \text{Eqn. 5}$$

$$Y_{in} = \frac{1}{Z_{ms}} + Y_s$$

Using the square conducting patches 306 of MPA 300 as shown in FIG. 3A as an example (e.g., graphene or plasmonic particles) with a size W and pitch L, the MPA impedance is given by Equation 6 as follows:

$$Z_{ms} = \frac{L}{W}\frac{1}{\sigma} - i\frac{\pi}{2\omega\bar{\epsilon}\epsilon_0 L \ln\left(\csc\left(\frac{\pi(L-W)}{2L}\right)\right)} \qquad \text{Eqn. 6}$$

$$\bar{\epsilon} = \frac{1}{2}(\epsilon_r + 1)$$

Furthermore, the conductivity of graphene is provided by Equation 7:

$$\sigma = i\frac{2e^2 k_B T}{\pi\hbar^2}\frac{1}{\omega - i\tau^{-1}}\ln\left\{2\cosh\left(\frac{E_F}{2k_B T}\right)\right\} - \qquad \text{Eqn. 7}$$
$$i\frac{e^2}{4\pi\hbar^2}\ln\left\{\frac{2E_F - \hbar(\omega - i\tau^{-1})}{2E_F + \hbar(\omega - i\tau^{-1})}\right\}$$

The Fermi level is related to the carrier density by Equation 8:

$$E_F = \hbar v_F\sqrt{\pi n_s} \qquad \text{Eqn. 8:}$$

In Eqn. 8, $v_F \approx 10^6$ m/s is the thermal velocity in graphene. A typical value for the relaxation time $\tau$ is 0.3 ps, and in general can be expressed by Equation 9 as follows:

$$\tau = \frac{\mu E_F}{e v_F^2} \qquad \text{Eqn. 9}$$

Typical values of graphene mobility have been identified as $\mu \approx 10000$-$60000$ cm$^2$/V-s. Again, the conductive patches may be implemented as plasmonic particles as an alternative to graphene. In an aspect, the plasmonic particles may be implemented as InAs/AlSb two-dimensional electron gas (2DEG) particles, as further discussed below. In accordance with such aspects, the conductivity of InAs/AlSb may be described by the Drude model in Equation 10 below as:

$$\sigma = \frac{e^2 E_F}{\pi \hbar^2} \frac{1}{-\omega + i\tau^{-1}} \quad \text{Eqn. 10}$$

$$\tau = \frac{m^* \mu}{e}$$

The areal density of electrons in the 2DEG particle $n_s$ may also be represented in accordance with Equation 11 as follows:

$$E_F = \frac{\pi \hbar^2 n_s}{m^*} \quad \text{Eqn. 11}$$

In Eqn. 11, $n_s$ is the electron surface density ($m^{-2}$), $m^*=0.1\, m_0$ is the effective mass, and $\mu=20000\, cm^2/V\text{-}s$ is the mobility for InAs 2DEG.

Simulated Performance of the Reflectarray

Again, aspects of the reflectarray 400 include tuning the phase imparted on an incident wave by tuning the electron density in the particles that are used in a particular MPA implementation via the application of appropriate electrical gate bias. In various aspects, the reflectarray 400 facilitates a range of main beam steering from 0 degrees (i.e., a direction normal to the reflectarray 400 ground plane 402) to +/−90 degrees (i.e., a direction +/−90 degrees to the normal direction and thus parallel to the ground plane 402). In an aspect, this can be achieved by providing the reflectarray 400 as one of two halves of a single reflectarray design. For instance, two reflectarrays 400 may be configured having phase gradients that are opposite to each other. In accordance with such aspects, the reflectarray antenna (which includes two separate reflectarrays 400) can facilitate a full 180 degrees of beam scan angles using the electronic tuning signal, as further discussed below with reference to FIG. 6.

Figure 6:
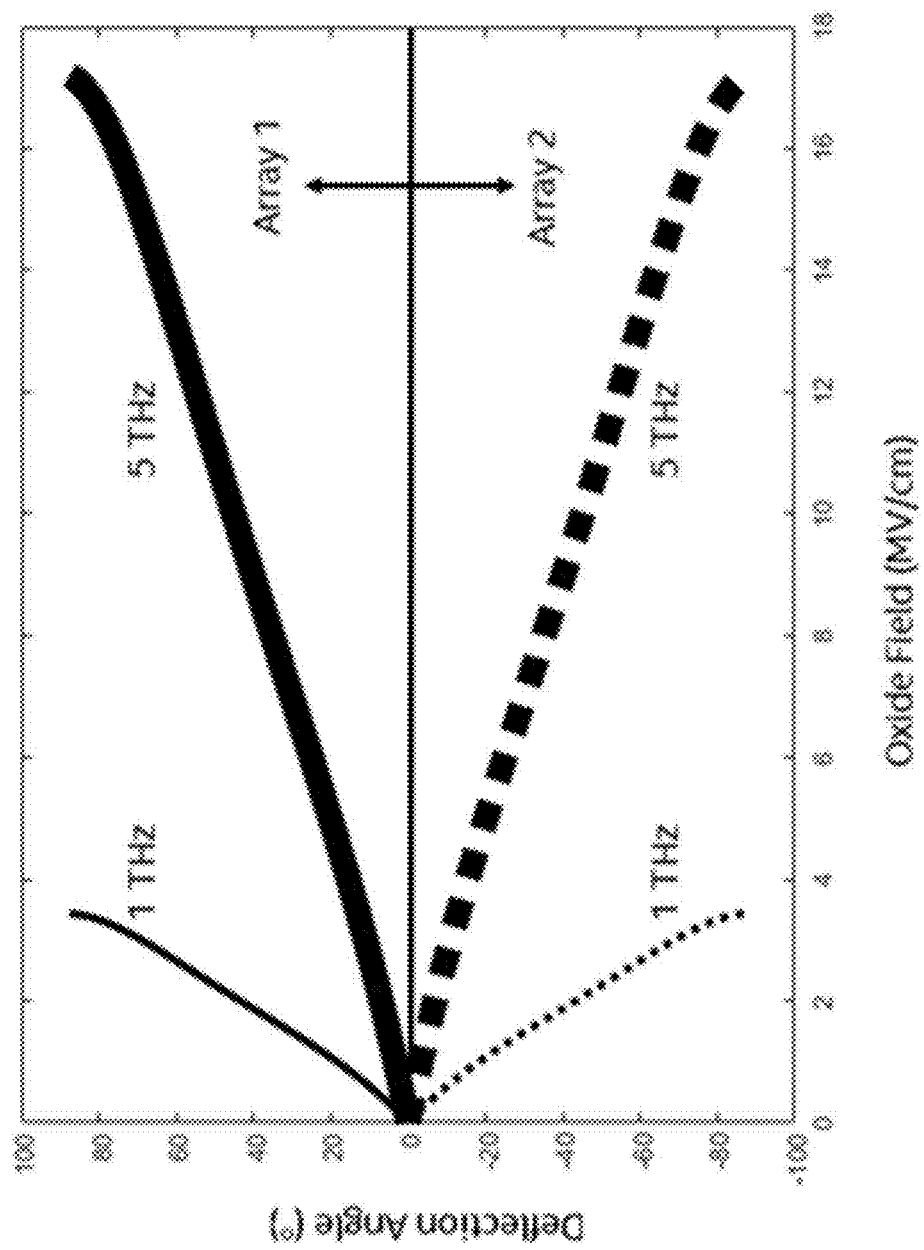
FIG. 6 illustrates a graph of simulated beam steering angle versus applied gate field according to an exemplary aspect of the present disclosure.

FIG. 6 illustrates a graph of simulated beam steering angle versus applied gate field according to an exemplary aspect of the present disclosure. The graph 600 in FIG. 6 indicates a simulated steering angle (in accordance with Eqn. 2) versus an applied gate field to demonstrate the feasibility of electrical tuning of beam direction using the reflectarray 400 as shown in FIG. 4. In the example simulation graphed in FIG. 6, the signal frequency (i.e., the operating frequency associated with the incident and reflected waves) is for two separate THz band applications—one at 1 THz and another at 5 THz. Moreover, the simulation is associated with MPA 300, as shown in FIG. 3A, which has graphene particles 306 with a diameter D of approximately 15 μm (e.g., within 1% tolerance, 5% tolerance, 10% tolerance, etc.) and a pitch L of approximately 30 μm (e.g., within 1% tolerance, 5% tolerance, 10% tolerance, etc.). Graphene patches of such dimensions are easy to manufacture using, for example, lithographic technologies. In the graph 600 shown in FIG. 6, two separate reflectarrays with opposite phase gradients are used to realize a full 180 degree beam scan, as discussed above.

Reflectarray Manufacturing Techniques

Figure 7A:
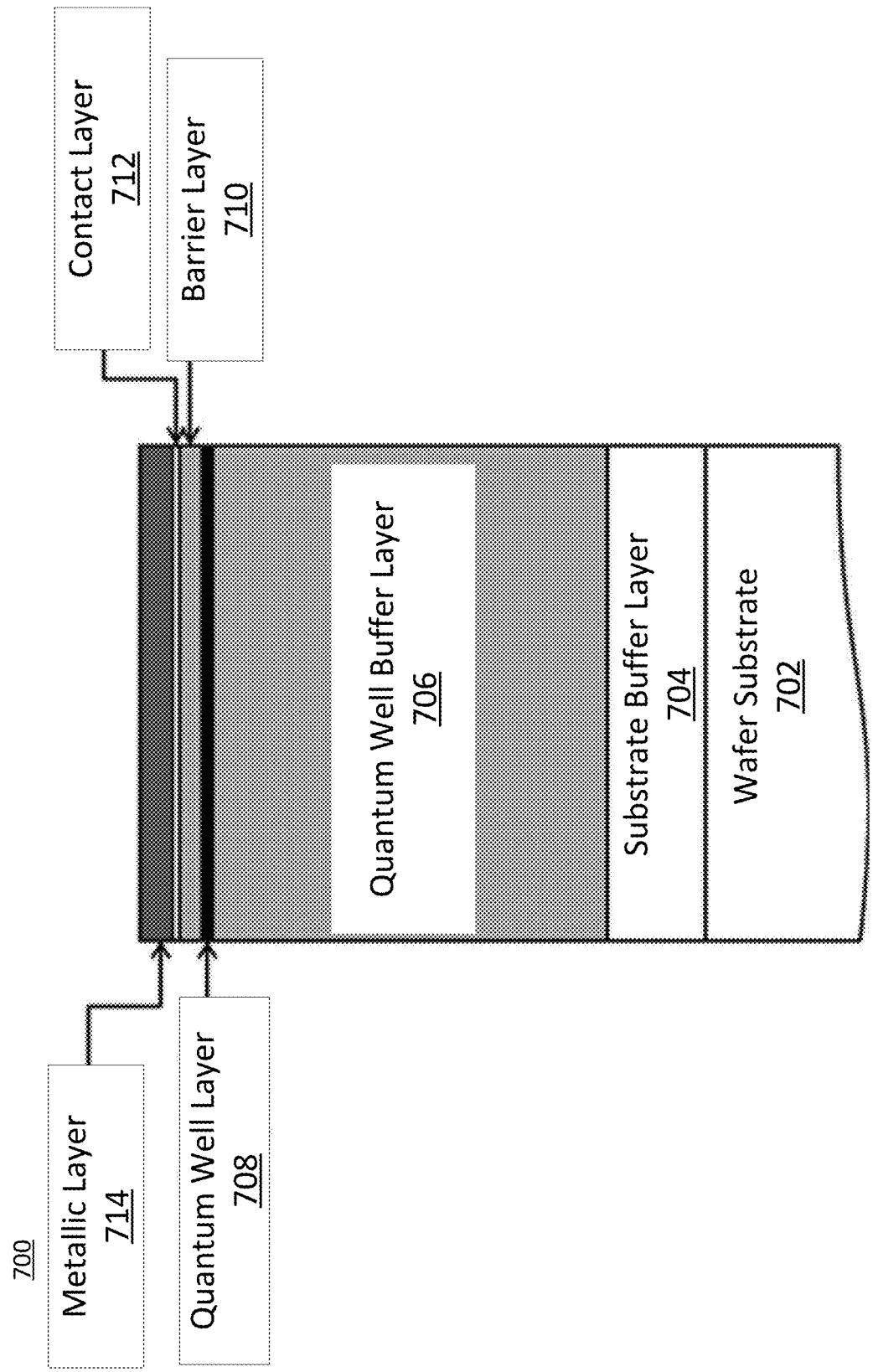
FIGS. 7A-7C illustrate a block diagram showing the various layers associated with growing a plasmonic device according to an exemplary aspect of the present disclosure.
Figure 7C:
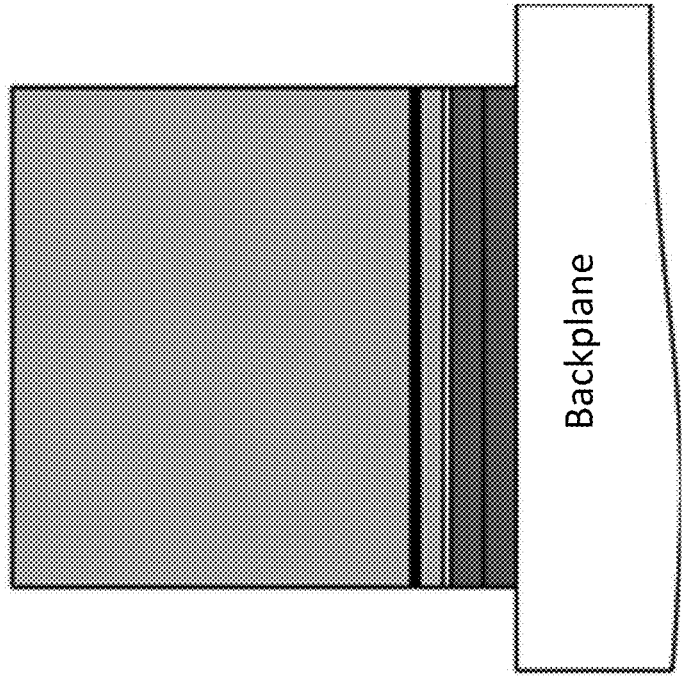
Figure 7B:
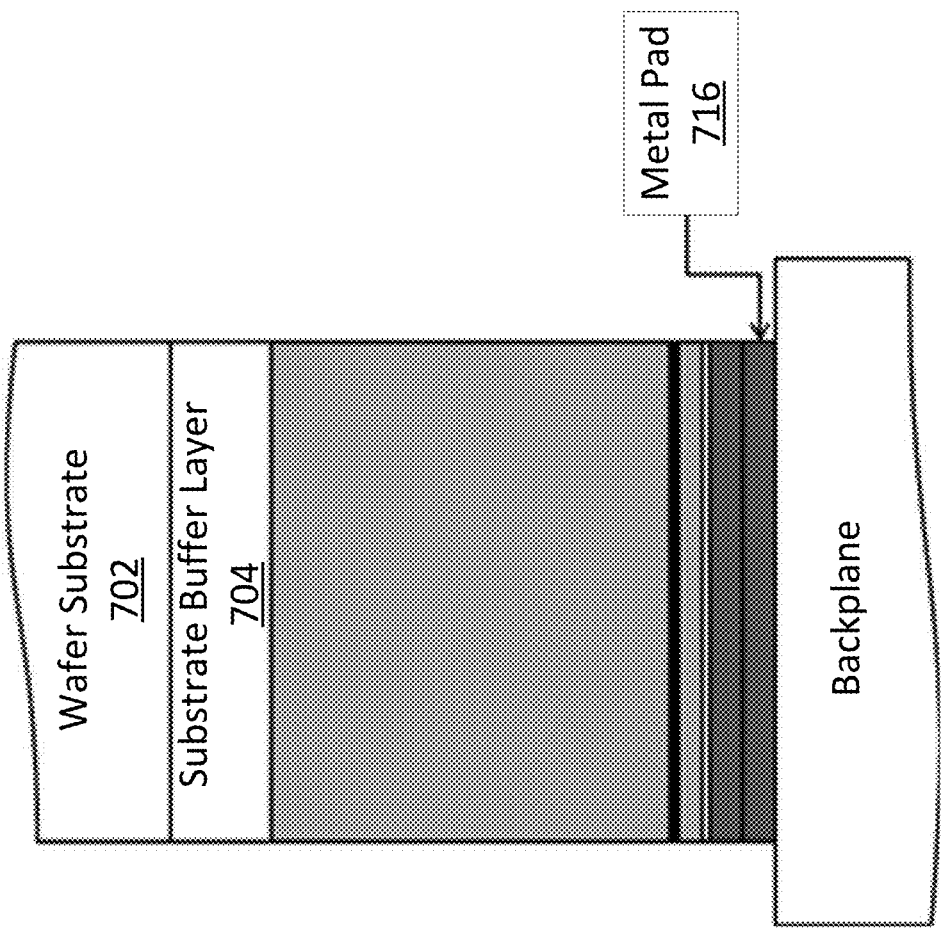

FIGS. 7A-7C illustrate a block diagram showing the various layers associated with growing a plasmonic device according to an exemplary aspect of the present disclosure. Again, the particles associated with an MPA (e.g., MPAs 300 and 350, as shown in FIGS. 3A and 3B, respectively) may be implemented, for example, as graphene patches or plasmonic devices. Graphene patches may be manufactured, for instance, in accordance with known lithographic techniques, while aspects include the plasmonic devices being manufactured using different techniques.

For example, a plasmonic device 700 is shown in FIG. 7A as having multiple layers that are placed upon an initial wafer substrate 702. In an aspect, the plasmonic device 700 may be implemented using any suitable number of layers selected from any combination of Group III-V compounds to form a two-dimensional electron gas (2DEG) element. The resulting 2DEG element may include a quantum well as shown in FIG. 7A, which has a high electron mobility, as further discussed herein.

In an aspect, the wafer substrate 702 may be implemented, for example, as a GaAs substrate having any suitable thickness. The various layers shown in FIG. 7A may then be grown on top of the wafer substrate 702 in different stages. The growth of the various layers described herein, unless otherwise noted, may be performed in accordance with any suitable artificial growth techniques, such as via epitaxy, for example (e.g., molecular beam epitaxy (MBE), metalorganic vapor phase epitaxy (MOVPE), etc.). In various aspects, the growth may be performed in accordance with any suitable conditions based upon the particular method that is implemented, such as using growth temperatures between 400° C.-600° C., for example.

In an aspect, a substrate buffer layer 704 is grown on the wafer substrate 702. The substrate buffer layer 704 may be implemented, for example, as another GaAs substrate having any suitable thickness such as, for example, between 100-200 nm, 150 nm, etc.

In accordance with the present aspects, a quantum well buffer layer 706 is grown on top of the substrate buffer layer 704. The quantum well buffer layer 706 may be implemented, for example, as an $Al_xGa_{1-x}AsSb$ compound having any suitable thickness such as, for example, between 400-800 nm, 600 nm, etc. In various aspects, the value of 'x' with regards to the $Al_xGa_{1-x}AsSb$ compound may be, for example, within a range of 0 and 0.8.

In accordance with the present aspects, a quantum well layer 708 is grown on top of the quantum well buffer layer 706. The quantum well layer 708 may be implemented, for example, as an InAs compound having any suitable thickness such as, for example, between 5-25 nm, 15 nm, etc.

In accordance with the present aspects, a barrier layer 710 is grown on top of the quantum well layer 708. The barrier layer 710 may be implemented, for example, as an $Al_xGa_{1-x}AsSb$ compound having any suitable thickness such as, for example, between 20-50 nm, 35 nm, etc. Like the substrate buffer layer 704, various aspects include the value of 'x' with regards to the $Al_xGa_{1-x}AsSb$ compound for the barrier layer 710 being, for example, within a range of 0 and 0.8. The barrier layer 710, quantum well layer 708, and the quantum well buffer layer 706 thus form a quantum well associated with the plasmonic device 700.

In accordance with the present aspects, a contact layer 712 is grown on top of the barrier layer 710. The contact layer 712 may be implemented, for example, as a GaAsSb compound having any suitable thickness such as, for example, between 5-15 nm, 10 nm, etc.

In accordance with the present aspects, a metallic layer 714 is grown on top of the contact layer 712. The metallic layer 714 may be implemented, for example, using any suitable conductor (e.g., Molybdenum) and having any suitable thickness such as, for example, between 25-75 nm, 50 nm, etc. In various aspects, the metallic layer 714 may be formed using any suitable techniques, such as sputtering, for example.

Once each of the layers is complete, the plasmonic device 700 may be considered an "epi-stack," which is then bonded to a metal pad 716 via a flip-chip process, as shown in FIG. 7B. This bonding process may include, for example, a wafer-to-wafer bonding technique or any other suitable technique to do so. The backplane shown in FIG. 7B may include, for example, the backplane as shown in FIG. 4, which includes a ground plane 402 and an interlayer dielectric 404. Thus, the plasmonic device 700 may be bonded to the metal pad 716 as shown in FIG. 7B, and the metal pad 716 may be positioned in various locations on a MPA (e.g., MPA 300) in place of the graphene patches. In other words, the epi-stack may be bonded to an MPA in each location occupied by the graphene patches 306/356 as shown in FIGS. 3A-3B, for example, which the graphene patches 306/356 being replaced by metal pads 716 in this example to which the metallic layer 714 is bonded.

Once the metallic layer 714 is bonded to the metal pad 716, the wafer substrate and 702 and the substrate buffer layer 704 may be removed to produce the plasmonic device 750 as shown in FIG. 7C, which is now a 2DEG patch having, in this example, an InAs/AlSb heterostructure. Assuming that the quantum well layer is implemented as an InAs compound, the applied bias on the metal gate will control the amount of electrons in the InAs quantum well, and thus the conductivity. And by controlling the InAs conductivity, the phase imparted on the reflected electromagnetic wave may be adjusted, thus producing beam steering and beam forming.

Figure 8:
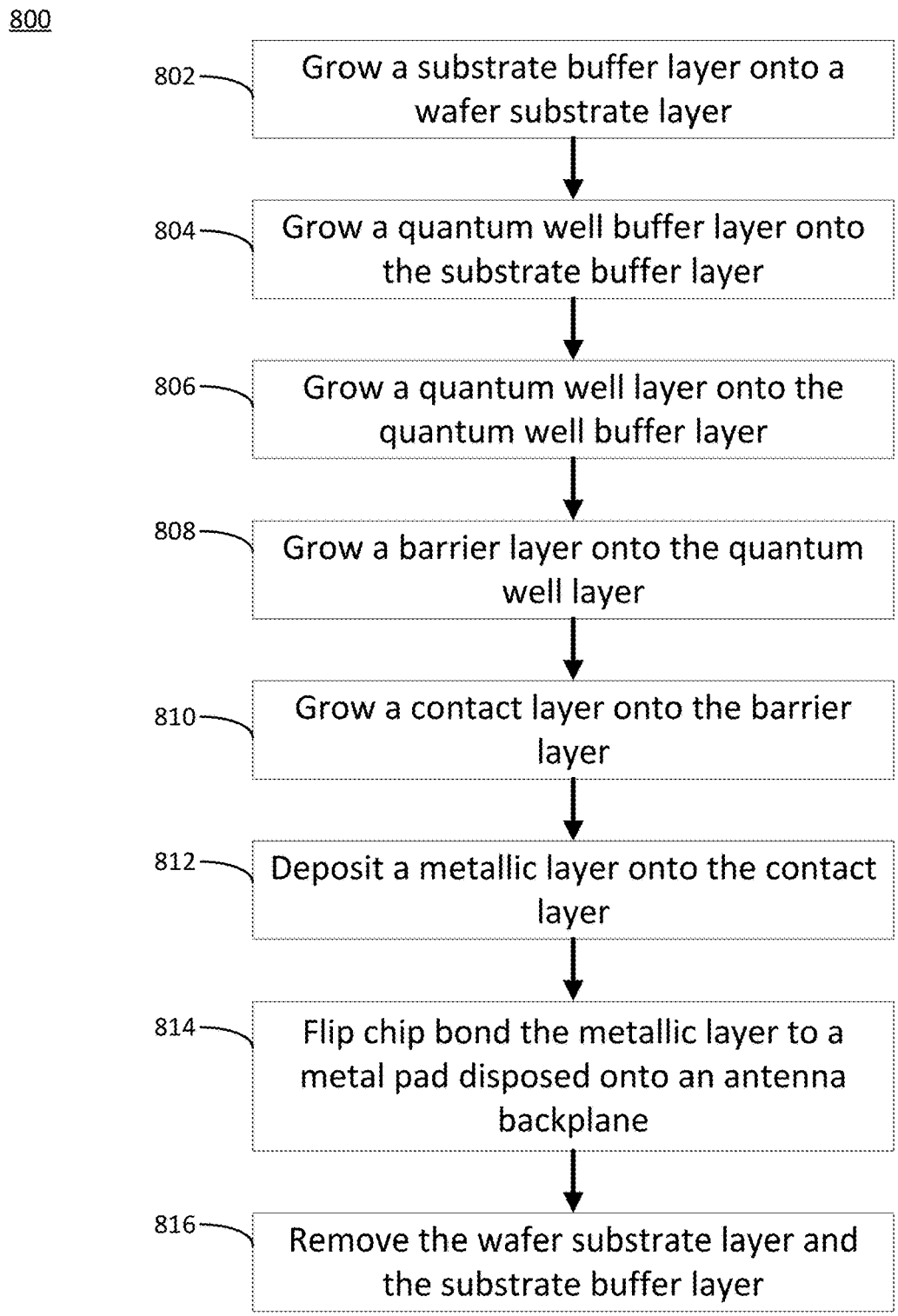
FIG. 8 illustrates a plasmonic device manufacturing method according to an exemplary aspect of the present disclosure.

FIG. 8 illustrates a plasmonic device manufacturing method according to an exemplary aspect of the present disclosure. The manufacturing method 800 can include growing a substrate buffer layer onto a wafer substrate layer (block 802). This can include, for example, growing a GaAs buffer layer onto a GaAs substrate, such as the substrate buffer layer 704 that is grown onto the wafer substrate 702, as shown and discussed with reference to FIG. 7A.

The manufacturing method 800 may further include growing a quantum well buffer layer onto the substrate buffer layer (block 804). This can include, for example, growing a $Al_xGa_{1-x}AsSb$ compound layer onto a GaAs substrate, such as the quantum well buffer layer 706 that is grown onto the substrate buffer layer 704, as shown and discussed with reference to FIG. 7A.

The manufacturing method 800 may further include growing a quantum well layer onto the quantum well buffer layer (block 806). This can include, for example, growing an InAs compound layer onto a $Al_xGa_{1-x}AsSb$ compound layer, such as the quantum well layer 708 that is grown onto the quantum well buffer layer 706, as shown and discussed with reference to FIG. 7A.

The manufacturing method 800 may further include growing a barrier layer onto the quantum well layer (block 808). This can include, for example, growing a $Al_xGa_{1-x}AsSb$ compound layer onto an InAs compound layer, such as the barrier layer 710 that is grown onto the quantum well layer 708, as shown and discussed with reference to FIG. 7A.

The manufacturing method 800 may further include growing a contact layer onto the barrier layer (block 810). This can include, for example, growing a GaAsSb compound layer onto an $Al_xGa_{1-x}AsSb$ compound layer, such as the contact layer 712 that is grown onto the barrier layer 710, as shown and discussed with reference to FIG. 7A.

The manufacturing method 800 may further include depositing a metallic layer onto the contact layer (block 812). This can include, for example, depositing a Molybdenum layer onto a GaAsSb compound layer, such as the metallic layer 714 that is grown onto the contact layer 712, as shown and discussed with reference to FIG. 7A.

The manufacturing method 800 may further include flip chip bonding the metallic layer to a metal pad disposed onto an antenna backplane (block 814). This can include, for example, performing a wafer-to-wafer bonding process to bond the metallic layer 714 to the metal pad 716 that is formed on an MPA, as shown and discussed with reference to FIG. 7B.

The manufacturing method 800 may further include removing the wafer substrate layer and the substrate buffer layer (block 816). This can include, for example, removing the wafer substrate 702 and the substrate buffer layer 704, as shown and discussed with reference to FIG. 7C.

Implementation of the Reflectarray in a Wireless Virtual Reality (VR) System

Wireless communications for applications requiring high bandwidth and low latency may be achieved via, for example, the mmWave and THz frequency bands. One example of such an application is wireless virtual-reality (VR) systems. To provide additional background regarding such applications, typical high-quality VR systems need to stream approximately 5.2 Gbps of data from their data source (single-user PC or game console) to A receiver (e.g., a VR head-mount-display (HMD)). As a result, conventional implementations of VR systems utilize wired data communications with an HDMI cable coupled between the HMD and the PC. These wired solutions not only limit the player's mobility and interfere with the VR experience, but also creates a tripping hazard as the headset covers the player's eyes during use. Typical wireless systems (e.g., Wi-Fi), cannot support the required streaming data rates for such applications.

This challenge has led to the use of various bulky and awkward solutions. For example, previous attempts to deliver an untethered VR experience include providing a full PC in a player's backpack. The Wireless Gigabit Alliance (commonly called WiGig) has also been working to leverage the state of the art in millimeter-wave technology to enable widespread use of the unlicensed 60 GHz bands, which have been specifically designed to deliver multi Gbps data rates. For example, the 802.11ad standard operated in the mmWave band can transmit over 2 GHz of bandwidth and deliver up to 6.8 Gbps. This solution, however may provide insufficient bandwidth for future VR resolution/latency requirements for single and/or multi user VR applications. However, the intrinsic bandwidth advantages of THz-based wireless communication schemes can facilitate the use of VR video links for multi-user applications with minimum compression, therefore reducing overall system latency and increasing efficiency.

Therefore, the use of the Terahertz band (e.g., 1 THz and above) in accordance of the aspects of the reflectarray antenna as described herein may facilitate wireless VR communications by providing a much higher bandwidth compared to conventional systems while achieving fast scanning of transmitter beam pointing for HMD communications. For instance, because mmWave radios use highly directional antennas, they work only when the transmitter's beam is aligned with the receiver's beam. Convention solutions with mmWave VR systems also implement static links, necessitating a fixed alignment between the transmitter and receiver. And since the wavelength is very small, even a small movement of the headset can hamper the alignment and break the link.

Given the aforementioned strict bandwidth and latency requirements for wireless VR communications, the correct alignment between transmit and receive antennas needs to be faster than approximately 10 milliseconds. Therefore, the transmitted beam needs to be scanned very quickly in accordance with such applications, which can advantageously be achieved in accordance with the aspects of the reflectarray electronic control as discussed herein.

Figure 9:
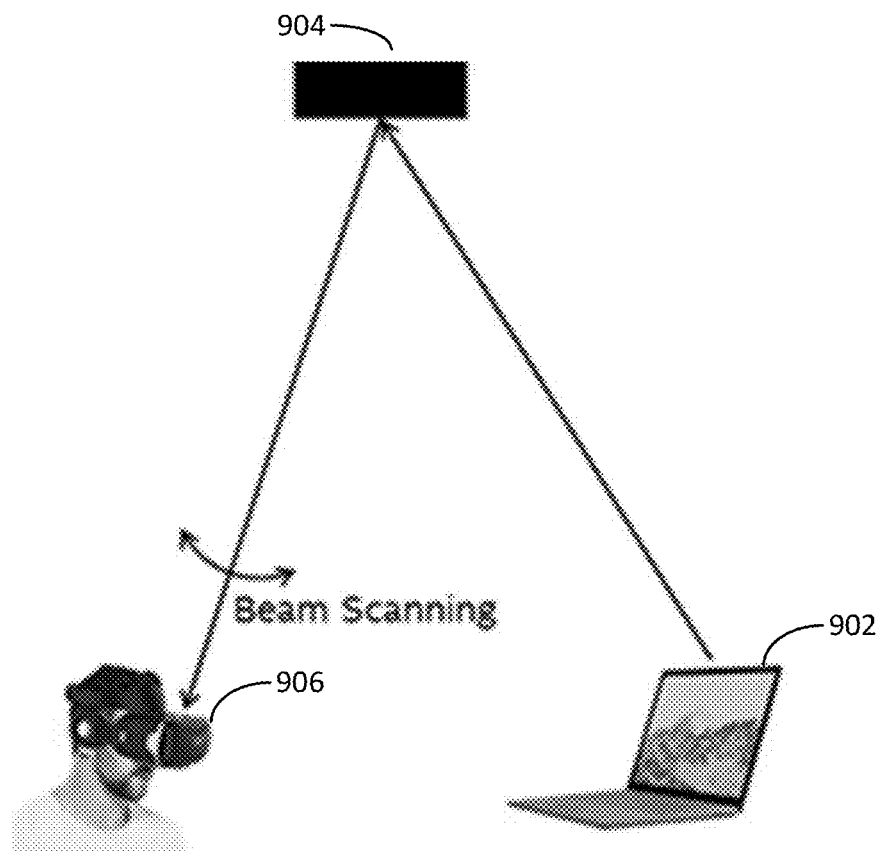
FIG. 9 illustrates a block diagram of a virtual reality application implementing a reflectarray according to an exemplary aspect of the present disclosure.

FIG. 9 illustrates a block diagram of a virtual reality application implementing a reflectarray according to an exemplary aspect of the present disclosure. In an aspect, a wireless VR environment 900 includes a computing device 902, a reflectarray antenna 904, and a VR headset 906. The VR environment 900 may include additional alternative, or less components than those shown in FIG. 9, which are provided as an example and not by way of limitation. Moreover, the computing device 902, the reflectarray antenna 904, and the VR headset 906 may be configured to communicate wirelessly with one another in accordance with one or more suitable frequencies, frequency bands, and/or communication protocols (e.g., THz bands). For example, the computing device 902 may be configured to transmit wireless VR content to the VR headset 906 via the reflectarray antenna 904.

Thus, computing device 902 may be implemented as any suitable type of computing device configured to generate and wirelessly transmit VR-streaming data to the VR headset 906. For example, although pictured in FIG. 9 as a laptop computer, the computing device 902 may be implemented as a desktop computer, tablet computer, wearable electronic device, etc.

Moreover, the VR headset 906 may be configured as any suitable computing device configured to wirelessly receive VR-streaming data transmitted by the computing device 902, process the data, and display the VR content to a user. In the example shown in FIG. 9, the computing device 902 is illustrated as transmitting data to the VR headset 906 in one direction. However, aspects include this process being reciprocated such that the VR headset 906 may transmit any suitable type of data to the computing device 902.

In an aspect, the reflectarray antenna 904 is an implementation of the reflectarray antenna 400, for example, as shown and discussed herein with reference to FIG. 4. Again, the reflectarray antenna 400 as discussed herein may be implemented for any suitable number and type of wireless communications, such as mmWave and THz frequencies. And because aspects of the reflectarray antenna 400 as discussed herein are particularly well-suited to performing beam steering and beamforming within these bands given the advantages that the electronic tuning control provides, the reflectarray aspects as discussed herein can advantageously facilitate wireless VR communications.

Accordingly, aspects include the reflectarray antenna 904 being configured to dynamically track the VR headset 906 and to dynamically tune a reflectarray included as part of the reflectarray antenna 904 such that impending waves (e.g., the data transmissions from the computing device 902 to the VR headset 906, and vice-versa) are directed towards the VR headset 906 and the computing device 902 as part of a steerable and configurable radiation pattern. In doing so, aspects include the reflectarray antenna 904 facilitating a high speed wireless communication link between the computing device 902 and the VR headset 906.

In an aspect, the reflectarray antenna 904 can include a controller (e.g., controller 206, as shown in FIG. 2). Aspects include the controller implemented by the reflectarray antenna 904 facilitating the dynamic tracking of the VR headset 906 and performing dynamic beam steering and beam forming. In this way, the reflectarray antenna 904 can facilitate wireless VR communications between the computing device 902 and the VR headset 906. In an aspect, the controller implemented by the reflectarray antennas 904 may leverage the use of tracking data that is generated by VR systems to facilitate such tracking. For example, VR systems typically track the VR headset as part of their ordinary operation, and thus signals transmitted by the computing device 902 may include tracked location data indicating the location of the VR headset 906 in three-dimensional space at any particular point in time. The controller implemented by the reflectarray antenna 904 may thus utilize this information to electronically steer the beam from the reflectarray antenna 904 to the VR headset 906 by generating the appropriate electronic tuning signals, as discussed herein. Again, the beam steering (i.e., the change in the direction of a reflected impending wave from one direction to another in response to changes to the electronic tuning signal) may occur over a time frame that is on the order of several microseconds (e.g., 1 microsecond, 2 microseconds, 5 microseconds, 10 microseconds, etc.).

EXAMPLES

The following examples pertain to further aspects.

Example 1 is a steerable antenna array, comprising: a plurality of micro particle arrays (MPAs), each MPA from among the plurality of MPAs including an insulator substrate having a first surface and a second surface opposite to the first surface, a plurality of graphene particles disposed upon the first surface, and a metal gate disposed on the second surface, with each graphene particle from among the plurality of graphene particles having a dimension that is a subwavelength of an operating wavelength associated with an incident source wave that is reflected off the plurality of micro particle arrays (MPAs) to form a main beam angle corresponding to a predetermined steerable radiation pattern; and a ground plane upon which a dielectric substrate is disposed, wherein the dielectric substrate is disposed between the plurality of MPAs and the ground plane, the metal gate associated with each respective MPA being configured to receive a separate electrical tuning signal that changes a respective electron carrier density associated with each of the plurality of graphene particles on that respective MPA to thereby adjust a direction of the main beam angle.

In Example 2, the subject matter of Example 1, wherein the change in electron carrier density associated with each of the plurality of graphene particles associated with each respective MPA causes a change in the phase of the incident source wave to adjust the direction of the main beam angle.

In Example 3, the subject matter of Example 1, wherein the plurality of MPAs, the dielectric substrate, and the ground plane form a reflectarray.

In Example 4, the subject matter of Example 1, wherein the operating wavelength of the incident source wave is associated with a frequency equal to or greater than 1 Terahertz (THz).

In Example 5, the subject matter of Example 1, wherein the subwavelength of the operating frequency is equal to or less than one-twentieth of the operating frequency.

In Example 6, the subject matter of Example 1, wherein each of the plurality of graphene particles associated with each respective MPA have a respective electron mobility equal to or greater than 10,000 cm$^2$/V-s.

Example 7 is a steerable antenna array, comprising: a plurality of micro particle arrays (MPAs), each MPA from among the plurality of MPAs including an insulator substrate having a first surface and a second surface opposite to the first surface, a plurality of plasmonic particles disposed upon the first surface, and a metal gate disposed on the second surface, with each graphene particle from among the plurality of graphene particles having a dimension that is a subwavelength of an operating wavelength associated with an incident source wave that is reflected off the plurality of micro particle arrays (MPAs) to form a main beam angle corresponding to a predetermined steerable radiation pattern; and a ground plane upon which a dielectric substrate is disposed, wherein the dielectric substrate is disposed between the plurality of MPAs and the ground plane, the metal gate associated with each respective MPA being configured to receive a separate electrical tuning signal that changes a respective electron carrier density associated with each of the plurality of plasmonic particles on that respective MPA to thereby adjust a direction of the main beam angle.

In Example 8, the subject matter of Example 7, wherein each of the plurality of plasmonic particles associated with each respective MPA includes a quantum well of two-dimensional electron gas (2DEG) elements.

In Example 9, the subject matter of Example 8, wherein the 2DEG elements are comprised of an InAs/AlSb heterostructure.

In Example 10, the subject matter of Example 7, wherein the operating wavelength of the incident source wave is associated with a frequency equal to or greater than 1 Terahertz (THz).

In Example 11, the subject matter of Example 7, wherein the subwavelength of the operating frequency is equal to or less than one-twentieth of the operating frequency.

In Example 12, the subject matter of Example 7, wherein each of the plurality of plasmonic particles associated with each respective MPA have a respective electron mobility equal to or greater than 20,000 cm$^2$/V-s.

Example 13 is a steerable antenna array, comprising: a controller configured to process signals transmitted from a computing device, the signals including virtual reality data and indicating a tracked location of a virtual reality headset; and a steerable antenna array including: a plurality of micro particle arrays (MPAs), each MPA from among the plurality of MPAs including an insulator substrate having a first surface and a second surface opposite to the first surface, a plurality of particles disposed upon the first surface, and a metal gate disposed on the second surface, with each particle from among the plurality of particles having a dimension that is a subwavelength of an operating wavelength associated with an incident source wave that is reflected off the plurality of micro particle arrays (MPAs) to form a main beam angle corresponding to a predetermined steerable radiation pattern; and a ground plane upon which a dielectric substrate is disposed, the dielectric substrate being disposed between the plurality of MPAs and the ground plane, the metal gate associated with each respective MPA being configured to receive a separate electrical tuning signal from the controller to change a respective electron carrier density associated with each of the plurality of particles on that respective MPA to thereby adjust a direction of the main beam angle associated with the steerable antenna array, wherein the controller is further configured to, in response to processing the signals transmitted from the computing device, to adjust the electrical tuning signal applied to one or more of the metal gates associated with each respective MPA to adjust the direction of the main beam angle towards the tracked location of the virtual reality headset.

In Example 14, the subject matter of Example 13, wherein each of the plurality of particles associated with each respective MPA is a patch comprised of two-dimensional electron gas (2DEG) elements.

In Example 15, the subject matter of Example 13, wherein each of the plurality of particles associated with each respective MPA is a patch comprised of graphene.

In Example 16, the subject matter of Example 13, wherein the steerable antenna array is configured to adjust the direction of the main beam angle from one direction to another, in response to changes to the electrical tuning signal, in less than 10 microseconds.

In Example 17, the subject matter of Example 13, wherein the operating wavelength of the incident source wave is associated with a frequency equal to or greater than 24 Gigahertz (GHz).

In Example 18, the subject matter of Example 13, wherein the operating wavelength of the incident source wave is associated with a frequency equal to or greater than 1 Terahertz (THz).

Example 19 is a method, comprising: growing, via artificial epitaxy, a substrate buffer layer onto a wafer substrate; growing, via artificial epitaxy, a quantum well onto the substrate buffer layer on a surface of the substrate buffer layer that is opposite to the wafer substrate by: (i) growing a quantum well buffer layer onto the substrate buffer layer; (ii) growing a quantum well layer onto the quantum well buffer layer; and (iii) growing a barrier layer onto the quantum well layer; growing, via artificial epitaxy, a contact layer onto the barrier layer on a surface of the barrier layer that is opposite to the quantum well layer; depositing, via sputtering, a metallic layer onto the contact layer on a surface of the contact layer that is opposite to the barrier layer; bonding, via wafer-to-wafer bonding, the metallic layer to a metal pad that is associated with an antenna backplane; and removing the wafer substrate and the substrate buffer layer.

In Example 20, the subject matter of Example 19, wherein growing the substrate buffer layer, growing the quantum well buffer layer, growing the quantum well layer, growing the barrier layer, and growing the contact layer each include growing the respective layers using a Group III-V compound.

In Example 21, the subject matter of Example 19, wherein: growing the substrate buffer layer includes growing the substrate layer as a GaAs compound, growing the quantum well buffer layer and the barrier layer includes growing each of the quantum well buffer layer and the barrier layer as an Al$_x$Ga$_{1-x}$AsSb compound, growing the quantum well layer includes growing the quantum layer as an InAs compound, and growing the contact layer includes growing the contact layer as a GaAsSb compound.

In Example 22, the subject matter of Example 21, wherein growing the quantum well buffer layer and the barrier layer includes growing each of the quantum well buffer layer and the barrier layer as an Al$_x$Ga$_{1-x}$AsSb compound with x having a range between 0 and 0.8.

In Example 23, the subject matter of Example 19, wherein: growing the substrate buffer layer includes growing the substrate layer having a thickness substantially equal to 150 nanometers (nm), growing the quantum well buffer layer includes growing the quantum well buffer layer having a thickness substantially equal to 600 nm, growing the quantum well layer includes growing the quantum well layer having a thickness substantially equal to 15 nm, growing the barrier layer includes growing the barrier layer having a thickness substantially equal to 35 nm, growing the contact layer includes growing the contact layer having a thickness substantially equal to 10 nm, and depositing the metallic layer onto the contact layer includes depositing the metallic layer having a thickness substantially equal to 50 nm.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to the 802.11 protocols (e.g., Wi-Fi and WiGig), and can be applied to other wireless protocols, including (but not limited to) Bluetooth, Near-field Communication (NFC) (ISO/IEC 18092), ZigBee (IEEE 802.15.4), Radio-frequency identification (RFID), and/or other wireless protocols as would be understood by one of ordinary skill in the relevant arts. Further, exemplary aspects are not limited to the above wireless protocols and can be used or implemented in one or more wired networks using one or more well-known wired specifications and/or protocols.

What is claimed is:

1. A steerable antenna array, comprising:
a plurality of micro particle arrays (MPAs), each MPA from among the plurality of MPAs including an insulator substrate having a first surface and a second surface opposite to the first surface, a plurality of graphene particles disposed upon the first surface, and a metal gate disposed on the second surface, with each graphene particle from among the plurality of graphene particles having a dimension that is a subwavelength of an operating wavelength associated with an incident source wave that is reflected off the plurality of MPAs to form a main beam angle corresponding to a predetermined steerable radiation pattern; and
a ground plane upon which a dielectric substrate is disposed,
wherein the dielectric substrate is disposed between the plurality of MPAs and the ground plane, the metal gate associated with each respective MPA being configured to receive a separate electrical tuning signal that changes a respective electron carrier density associated with each of the plurality of graphene particles on that respective MPA to thereby adjust a direction of the main beam angle.

2. The steerable antenna array of claim 1, wherein the change in electron carrier density associated with each of the plurality of graphene particles associated with each respective MPA causes a change in the phase of the incident source wave to adjust the direction of the main beam angle.

3. The steerable antenna array of claim 1, wherein the plurality of MPAs, the dielectric substrate, and the ground plane form a reflectarray.

4. The steerable antenna array of claim 1, wherein the operating wavelength of the incident source wave is associated with a frequency equal to or greater than 1 Terahertz (THz).

5. The steerable antenna array of claim 1, wherein the subwavelength of the operating frequency is equal to or less than one-twentieth of the operating frequency.

6. The steerable antenna array of claim 1, wherein each of the plurality of graphene particles associated with each respective MPA have a respective electron mobility equal to or greater than 10,000 $cm^2$/V-s.

7. A steerable antenna array, comprising:
a plurality of micro particle arrays (MPAs), each MPA from among the plurality of MPAs including an insulator substrate having a first surface and a second surface opposite to the first surface, a plurality of plasmonic particles disposed upon the first surface, and a metal gate disposed on the second surface, with each plasmonic particle from among the plurality of plasmonic particles having a dimension that is a subwavelength of an operating wavelength associated with an incident source wave that is reflected off the plurality of MPAs to form a main beam angle corresponding to a predetermined steerable radiation pattern; and
a ground plane upon which a dielectric substrate is disposed, wherein the dielectric substrate is disposed between the plurality of MPAs and the ground plane, the metal gate associated with each respective MPA being configured to receive a separate electrical tuning signal that changes a respective electron carrier density associated with each of the plurality of plasmonic particles on that respective MPA to thereby adjust a direction of the main beam angle.

8. The steerable antenna array of claim 7, wherein each of the plurality of plasmonic particles associated with each respective MPA includes a quantum well of two-dimensional electron gas (2DEG) elements.

9. The steerable antenna array of claim 8, wherein the 2DEG elements are comprised of an InAs/AlSb heterostructure.

10. The steerable antenna array of claim 7, wherein the operating wavelength of the incident source wave is associated with a frequency equal to or greater than 1 Terahertz (THz).

11. The steerable antenna array of claim 7, wherein the subwavelength of the operating frequency is equal to or less than one-twentieth of the operating frequency.

12. The steerable antenna array of claim 7, wherein each of the plurality of plasmonic particles associated with each respective MPA have a respective electron mobility equal to or greater than 20,000 $cm^2$/V-s.

13. A steerable antenna array, comprising:
a controller configured to process signals transmitted from a computing device, the signals including virtual reality data and indicating a tracked location of a virtual reality headset; and
a steerable antenna array including:
a plurality of micro particle arrays (MPAs), each MPA from among the plurality of MPAs including an insulator substrate having a first surface and a second surface opposite to the first surface, a plurality of particles disposed upon the first surface, and a metal gate disposed on the second surface, with each particle from among the plurality of particles having a dimension that is a subwavelength of an operating wavelength associated with an incident source wave that is reflected off the plurality of MPAs to form a main beam angle corresponding to a predetermined steerable radiation pattern; and
a ground plane upon which a dielectric substrate is disposed, the dielectric substrate being disposed between the plurality of MPAs and the ground plane, the metal gate associated with each respective MPA being configured to receive a separate electrical tuning signal from the controller to change a respective electron carrier density associated with each of the plurality of particles on that respective MPA to thereby adjust a direction of the main beam angle associated with the steerable antenna array,
wherein the controller is further configured to, in response to processing the signals transmitted from the computing device, to adjust the electrical tuning signal applied to one or more of the metal gates associated with each respective MPA to adjust the direction of the main beam angle towards the tracked location of the virtual reality headset.

14. The steerable antenna array of claim 13, wherein each of the plurality of particles associated with each respective MPA is a patch comprised of two-dimensional electron gas (2DEG) elements.

15. The steerable antenna array of claim 13, wherein each of the plurality of particles associated with each respective MPA is a patch comprised of graphene.

16. The steerable antenna array of claim 13, wherein the steerable antenna array is configured to adjust the direction of the main beam angle from one direction to another, in response to changes to the electrical tuning signal, in less than 10 microseconds.

17. The steerable antenna array of claim 13, wherein the operating wavelength of the incident source wave is associated with a frequency equal to or greater than 24 Gigahertz (GHz).

18. The steerable antenna array of claim 13, wherein the operating wavelength of the incident source wave is associated with a frequency equal to or greater than 1 Terahertz (THz).

* * * * *